US006928301B2

United States Patent
Souissi et al.

(10) Patent No.: US 6,928,301 B2
(45) Date of Patent: Aug. 9, 2005

(54) DISTRIBUTED ARCHITECTURE WIRELESS RF MODEM

(75) Inventors: Slim Salah Souissi, San Diego, CA (US); Michael Scott Andrews, Escondito, CA (US); Ambrose W. C. Tam, Calgary (CA); John Andrew Adams, Escondio, CA (US)

(73) Assignee: Novatel Wireless, Inc., San Diego, CA (US)

( * ) Notice: Subject to any disclaimer, the term of this patent is extended or adjusted under 35 U.S.C. 154(b) by 443 days.

(21) Appl. No.: 09/925,566

(22) Filed: Aug. 8, 2001

(65) Prior Publication Data

US 2002/0082047 A1 Jun. 27, 2002

Related U.S. Application Data

(60) Provisional application No. 60/224,577, filed on Aug. 11, 2000.

(51) Int. Cl.[7] .............................................. H04M 1/00
(52) U.S. Cl. ...................... 455/557; 555/556; 555/558; 555/40
(58) Field of Search .............................. 455/557, 556.1, 455/556.2, 73, 550.1, 518, 519, 334, 426, 509, 521; 370/276, 270, 260

(56) References Cited

U.S. PATENT DOCUMENTS

| 5,404,374 A | | 4/1995 | Mullins et al. |
| 5,559,501 A | | 9/1996 | Barzegar et al. |
| 5,574,773 A | * | 11/1996 | Grob et al. ................. 455/466 |
| 5,606,594 A | | 2/1997 | Register et al. |
| 5,678,059 A | | 10/1997 | Ramaswamy et al. |
| 5,696,699 A | | 12/1997 | Nair |
| 5,809,432 A | | 9/1998 | Yamashita |
| 5,889,816 A | | 3/1999 | Agrawal et al. |
| 5,929,774 A | | 7/1999 | Charlton |
| 5,930,295 A | | 7/1999 | Isley, Jr. et al. |
| 6,026,119 A | | 2/2000 | Funk et al. |
| 6,049,745 A | * | 4/2000 | Douglas et al. ................. 701/23 |
| 6,108,562 A | | 8/2000 | Rydbeck et al. |
| 6,278,864 B1 | | 8/2001 | Cummins et al. |
| 6,295,298 B1 | | 9/2001 | Hrastar et al. |
| 6,671,517 B1 | * | 12/2003 | Lin et al. ..................... 455/518 |
| 6,697,421 B1 | * | 2/2004 | Monroe et al. ............. 375/222 |

* cited by examiner

Primary Examiner—Cong Van Tran
(74) Attorney, Agent, or Firm—Foley & Lardner LLP

(57) ABSTRACT

The present invention provides for a wireless radio frequency ("RF") modem that plugs into a host computer and shares a central processing unit and memory with the host computer, wherein principal modem functions are distributed between the modem and the host computer. In one embodiment, the modem performs RF conversion, and the host computer performs baseband processing and protocol stack control. In another embodiment, the modem performs RF conversion and baseband processing, and the host computer performs protocol stack control.

41 Claims, 8 Drawing Sheets

DISTRIBUTED ARCHITECTURE WIRELESS RF MODEM

This application claims the benefit of U.S. Provisional Application No. 60/224,577 filed Aug. 11, 2000.

FIELD OF THE INVENTION

The present invention is directed to wireless radio frequency modems and, more specifically, to detachable wireless radio frequency modems that share a central processing unit and memory with a host computing device.

BACKGROUND OF THE INVENTION

Current wireless radio frequency ("RF") modems that cooperatively operate with a host computing device ("host computer") typically include: (1) a radio portion, also called an RF front end or an RF head; (2) a modulator/demodulator portion, also called a baseband processing unit or baseband chip; (3) a central processing unit ("CPU") or processor; (4) memory; and (5) an interface. These modem components collectively operate during a wireless communications process to receive an electromagnetic RF signal in a receive mode, wherein the RF signal contains information to be extracted from the received RF signal, and in a transmit mode, wherein the components work collectively to transmit an electromagnetic RF signal and the RF signal contains the information to be transmitted. Moreover, during the receive and transmit modes, the modem components collectively operate to perform three principal modem functions: RF conversion, baseband processing and protocol stack control.

Typically during RF conversion, the RF head receives the RF signal during the receive mode and converts that RF signal into a modulated baseband analog signal and, during the transmit mode, the RF head converts a modulated baseband analog signal into an RF signal for transmission. During baseband processing, the baseband processing unit in the receive mode demodulates the modulated baseband analog signal by extracting a plurality of data bits that correspond to the information being received. In the transmit mode, the baseband processing unit generates the modulated baseband analog signal for processing by the RF head.

As part of the above wireless communications process, data bits being transmitted are wrapped with protocol bits of data to facilitate transmission, routing, and receiving of the data bits. Likewise, this protocol data must be removed to accurately reproduce, in the receiving RF modem, the data that was sent. The adding or stripping of the protocol bits, also called protocol stack control, is generally performed by the processor in the RF modem under the control of a protocol stack software program stored in the RF modem's memory. Finally, the interface feeds the data bits from the host computer to the RF modem for processing and transmission and feeds to the host computer the reproduced data bits that were extracted from the RF signal.

The host computer may typically be a laptop or palmtop computer, a Personnel Digital Assistant (PDA) such as a PALM Pilot or Handspring, a point of sale terminal, or some other computing system. Typical interfaces between the wireless RF modem and the host computer are RS-232, USB, Parallel Port, IrDa, PCMCIA, or Compact Flash. However, other interfaces are also used, including a variety of proprietary interfaces. Moreover, there are many wireless RF standards that must be considered in the design of any wireless RF modem. Some examples include: circuit switched commercial telecommunications standards including AMPS, CDMA (IS95A & B), and GSM; packet switched standards including CDPD, 1XRTT, GPRS, EDGE, and W-CDMA; and proprietary wide area wireless networks such as Metricom, Re-Flex, FLEX, Mobitex, and ARDIS.

Wireless RF modem use has grown very rapidly during recent years and is projected to continue to grow. Whereas in the past, only a few kinds of host computers were equipped with wireless RF modems, the trend of incorporating such modems is growing, especially with respect to wireless RF modems that plug into laptops and PDAs.

Typically, the detachable wireless RF modems that work cooperatively with host computers perform all of their functions with internal software and hardware. They rely on the host computers only to provide data to be transmitted and a receptacle for data received by the modem from the received RF signal. Accordingly, several hardware components and software functions are typically duplicated in the wireless modem and the host computer. For instance, both the modem and the host computer typically have a CPU, various types of memory, UARTS for serial transmission and reception of data, and other subsystems, with both the modem's and the host computer's CPU operating independently of each other. Such hardware and software duplications result in the high cost of wireless RF modems.

Prior art wireless RF modem architectures are therefore inadequate because they are expensive, consume more power than is needed due to the redundant hardware, take up more space, and weigh more than necessary. What is needed is a wireless RF modem that shares certain components resident in its host computer, thereby enabling the host computer to perform some of the modem's principal functions and thus eliminate the need for redundant hardware in the modem.

SUMMARY OF THE INVENTION

The present invention is directed at addressing the above-mentioned shortcomings, disadvantages, and problems of the prior art. A preferred embodiment of the present invention provides for a detachable wireless radio frequency (RF) modem constructed to cooperatively operate with a host computing device having a memory, a central processing unit ("CPU") for executing a protocol stack software program stored in the memory, and a baseband processing unit. The RF modem comprises: an antenna; an RF head coupled to the antenna and an interface.

The RF head is configured during a receive mode to receive an electromagnetic RF signal through the antenna and to convert the RF signal into a modulated baseband analog signal for baseband processing in the host computing device. The RF head is further configured during a transmit mode to receive a modulated baseband analog signal generated by the host computing device and to convert the modulated baseband analog signal into an electromagnetic RF signal to feed to the antenna. The interface is coupled to the RF head and configured to physically couple the RF modem to the host computing device. The interface is also configured during the receive mode to feed the modulated baseband analog signal, generated by the RF head, to the host computing device to enable the baseband processing unit to convert the modulated baseband analog signal into a plurality of bits of data including protocol data and then to remove the protocol data. The interface is further configured during the transmit mode to feed the modulated baseband analog signal, generated by the host computing device, to the RF head.

Thus, in this embodiment the wireless RF modem performs RF conversion. The baseband processing and the protocol stack control functions are performed by the host computing device.

Another embodiment of the present invention also provides for an RF modem comprising an antenna, an RF head to perform RF conversion, and an interface. However, the RF head has a predetermined set of operating characteristics, and the RF modem further comprises an RF identification ("RFID") unit coupled between said RF head and said interface. The RFID unit generates an identification signal that identifies the characteristics of the RF head, and the interface feeds the identification signal to the host computing device to enable the host computing device to decode the identification signal and determine the RF head's operating characteristics. In response thereto, the host computing device downloads the appropriate software to the baseband processing unit and enables the CPU to perform the appropriate protocol stack control in order to configure the entire RF modem according to the detected type of RF head.

Another embodiment of the present invention provides for an RF modem comprising an antenna, an RF head to perform RF conversion, and a baseband processing unit to perform baseband processing. The host computing device performs the protocol stack control. The RFID hardware can be added to this embodiment to create yet another embodiment of the present invention.

Another embodiment of the present invention provides for a system for providing wireless data communications comprising a detachable wireless RF modem for performing RF conversion, physically coupled to a host computing device that functions to provide baseband processing and protocol stack control. This embodiment can be implemented with or without the RFID hardware and software.

Another embodiment of the present invention comprises a system for providing wireless data communications comprising a detachable wireless RF modem for performing RF conversion and baseband processing, physically coupled to a host computing device that functions to provide protocol stack control. This embodiment can be implemented with or without the RFID hardware and software.

Another embodiment of the present invention provides for a method for wireless data communications in a system comprising a detachable wireless RF modem having an antenna, an RF head, and an interface, wherein the RF modem is constructed to cooperatively work with and be physically coupled at the interface to a host computing device, wherein the host computing device has a memory, a CPU for executing a protocol stack software program stored in the memory, and a baseband processing unit.

Another embodiment of the present invention comprises a method for wireless data communications in a system comprising a detachable wireless RF modem having an antenna, an RF head, a baseband processing unit, and an interface, wherein the RF modem is constructed to cooperatively work with and be physically coupled at the interface to a host computing device, wherein the host computing device has a memory and a CPU for executing a protocol stack software program stored in the memory.

The key objective of the present invention is to provide a low cost wireless RF modem by distributing the principal modem functions between a wireless RF modem and its host computing device. The advantage of the present invention is the elimination of redundant hardware in the RF modem and the host computing device, thereby enabling the RF modem to have fewer components and to consume less power during operation.

BRIEF DESCRIPTION OF THE DRAWINGS

The forgoing aspects and the attendant advantages of this invention will become more readily apparent by reference to the following detailed description, when taken in conjunction with the accompanying drawings, wherein.

DETAILED DESCRIPTION OF THE INVENTION

Figure 1:
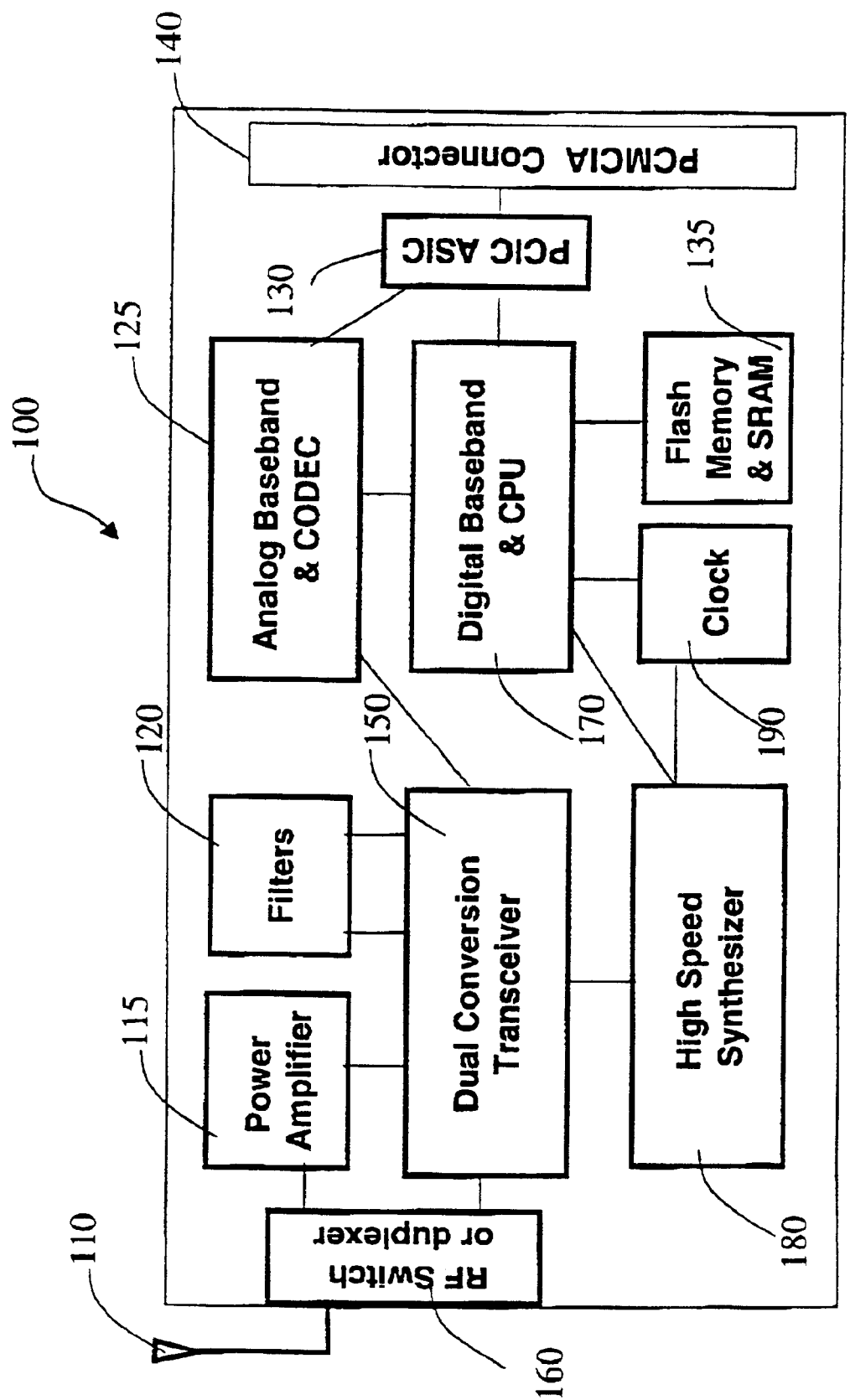
FIG. 1 is a schematic illustration of a prior art wireless RF modem that is designed to be plugged into a PCMCIA slot connector within a host computer.

FIG. 1 is a schematic illustration of a prior art wireless RF modem 100 that is designed to be plugged into a PCMCIA slot connector within a host computer. In this representation of prior art RF modem 100, Dual Conversion Transceiver 150, High Speed Synthesizer 180, Power Amplifier 115, Filters 120, and RF Switch 160 comprise an RF head, which performs RF conversion. Dual Conversion Transceiver 150 and High Speed Synthesizer 180 are available from Texas Instruments of Dallas, Tex. RF switch 160 may be a transmit/receive switch or a duplexer, as required by a given air standard.

Analog Baseband and Codec 125 and Digital Baseband and CPU 170 work in conjunction with Flash Memory and SRAM 135 and comprise the baseband processing unit and the CPU, which performs baseband processing and protocol stack control. Analog Baseband and Codec 125 and Digital Baseband and CPU 170 are available from Analog Devices of Norwood, Mass. RF modem 100 also includes an Antenna 110, a Clock 190, a PCIC ASIC 130, and a PCMCIA connector 140. The above components of RF modem 100 are electrically connected as illustrated by the solid lines in FIG. 1 between those components.

RF modem 100 operates as follows. In the receive mode, an electromagnetic RF signal is received at Antenna 110 which is connected to RF switch 160. The received RF signal is routed through RF switch 160 to Dual Conversion Transceiver 150, which converts the RF signal into a modulated baseband analog signal for baseband processing. Dual Conversion Transceiver 150 operates using various receive and transmit variable frequency oscillator signals that are provided by High Speed Synthesizer 180. The modulated RF signal from Dual Conversion Transceiver 150 is fed to Power Amplifier 115 which also is fed a signal that controls the power output so that Power Amplifier 115 can deliver requested power to RF Switch 160. Various filters as required for Dual Conversion Transceiver 150 are shown as Filters 120. The modulated baseband analog signal from Dual Conversion Transceiver 150 is fed into Analog Baseband and Codec 125 for proper demodulation to extract data bits comprising true data, which is representative of the information being received, protocol bits of data, and any security coding. Digital Baseband and CPU 170 further processes the received signal by executing a protocol stack software program, to separate the true data from the protocol data and to remove any security coding. Digital Baseband and CPU 170 then sends the true data through a timing and interface PCIC ASIC device 130 to PCMCIA connector 140 to be fed to a host computer. Clock 190 provides a system clock to Digital Baseband and CPU 170 and High Speed Synthesizer 180. Flash Memory and SRAM 135 provide for program storage and variable storage for Digital Baseband and CPU 170, e.g., storing the protocol stack software program.

In the transmit mode, true data to be transmitted is fed through PCMCIA Connector 140, through PCIC ASIC 130, to Digital Baseband and CPU 170, wherein the true data is wrapped with protocol data and any necessary security data and sent to Analog Baseband & Codec 125. Analog Baseband & Codec 125 generates the modulated baseband analog signal and sends it to Dual Conversion Transceiver 150 to generate the electromagnetic RF signal. The RF signal to be transmitted is then amplified by Power Amplifier 115 and sent through RF switch 160 to Antenna 110 for transmission. As illustrated in FIG. 1, prior art RF modem 100 has its own CPU and its own memory, and all modem functions are performed and controlled by components housed within RF modem 100.

Figure 2:
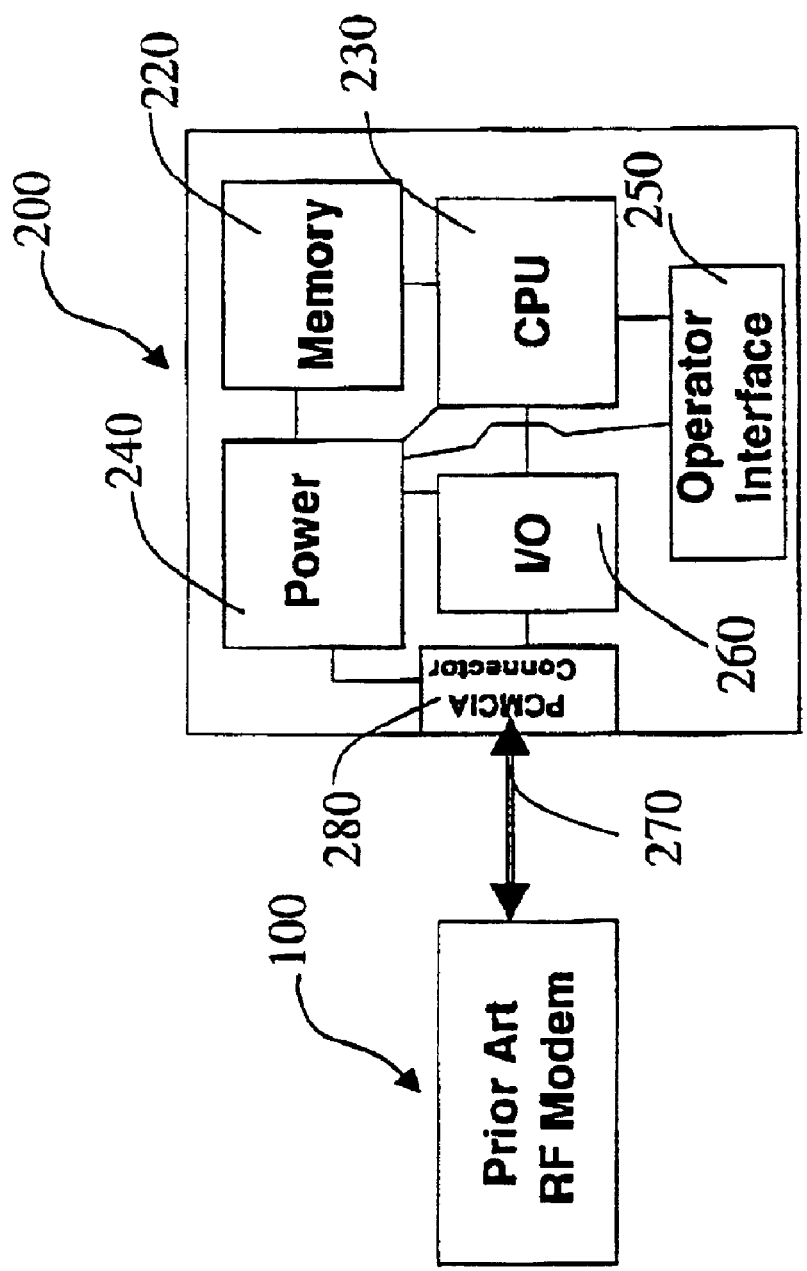
FIG. 2 is a schematic illustration of a prior art combination of the wireless RF modem of FIG. 1 and a host computer with a PCMCIA slot connector.

FIG. 2 is a schematic illustration of a prior art combination of wireless RF modem 100 of FIG. 1 and a host computer 200 with a PCMCIA slot connector 280. Double arrow 270 indicates an action of inserting and connecting wireless RF modem 100 to host computer 200, such that PCMCIA slot connector 280 is connected to PCMCIA Connector 140 in RF modem 100.

Host computer 200 contains a power source 240, a memory 220 that typically comprises a ROM, RAM, SRAM, Flash, or other combination of memory accessible by a CPU 230. Computer system Input/Output (I/O) circuitry is shown connecting CPU 230 to PCMCIA connector 280. Data to be sent or received by CPU 230 is communicated to PCMCIA connector 280 using standard software drivers for the connection and standard AT Modem commands. Operator interface 250 can be programmed to display information concerning the operation of the RF modem 100. When RF modem 100 is combined with host computer 200, there are several hardware functions that are duplicated, such as the PCMCIA hardware in both the modem and the host, memory in both, a CPU in both, and common software in both.

Figure 3:
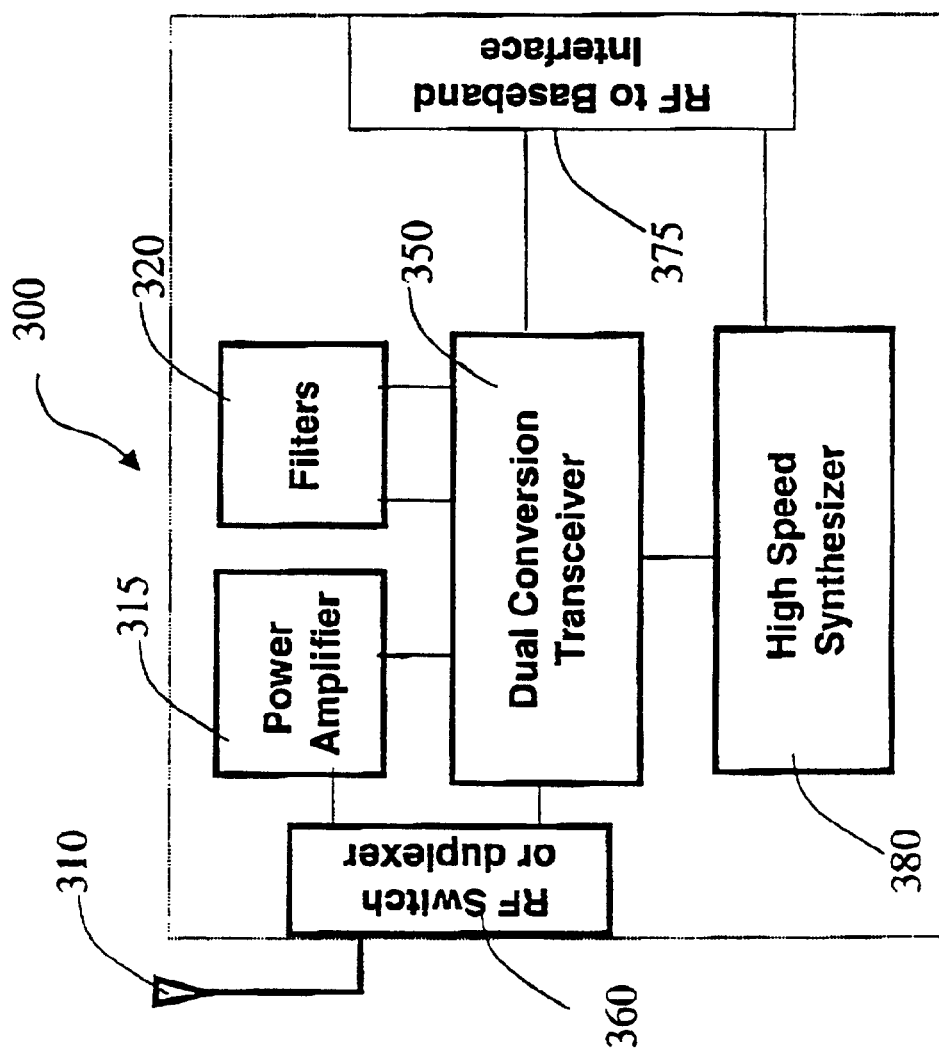
FIG. 3 is a schematic illustration of a detachable wireless RF modem in accordance with a preferred embodiment of the present invention, wherein the modem has an antenna, an RF head, and an interface.

FIG. 3 is a schematic illustration of a detachable wireless RF modem 300 in accordance with a preferred embodiment of the present invention, wherein RF modem 300 comprises an Antenna 310, an RF head, and an RF to Baseband Interface 375. The RF head comprises RF switch or duplexer 360, Dual Conversion Transceiver 350, High Speed Synthesizer 380, Power Amplifier 315, and Filters 320, and performs RF conversion. RF modem 300 can be constructed using standard components. For instance: Dual Conversion Transceiver 350 and High Speed Synthesizer 380 are available from Texas Instruments of Dallas, Tex.; and RF to Baseband Interface 375 can be any standard interface that enables RF modem 300 to be inserted in a conventional way into an available slot in the host computing device, i.e., Interface 375 enables RF modem 300 to be dimensioned to fit within a cradle for a PDA or enables RF modem 300 to be dimensioned to correspond to a PCMCIA personal computer card. Thus, RF modem 300 can be designed to be housed inside the host computing device or it can be connected external to the host computing device. Moreover, the above components of RF modem 300 are electrically connected as illustrated by the solid lines in FIG. 3 between those components.

RF modem 300 operates as follows. In the receive mode, Antenna 310 receives an electromagnetic RF signal and forwards the RF signal to RF Switch 360. RF switch 360 may be a transmit/receive switch or a duplexer as required by the air standard. The received RF signal is then routed from RF switch 360 to Dual Conversion Transceiver 350 for conversion into a modulated baseband analog signal. Dual Conversion Transceiver 350 operates using various receive and transmit variable frequency oscillator signals that are provided by High speed Synthesizer 380. Power amplifier 315 is fed the modulated RF signal from Dual Conversion Transceiver 350 and is fed a signal that controls power output so that Power Amplifier 315 can deliver requested power to RF Switch 360. The modulated baseband analog signal from Dual Conversion Transceiver 350 is fed through RF to Baseband Interface 375 to a host computer for external baseband processing and protocol stack control.

In the transmit mode, an externally generated modulated baseband analog signal is fed into the RF head through RF to Baseband Interface 375 and directed to Dual Conversion Transceiver 350 where the modulated baseband analog signal is converted to an electromagnetic RF signal. The RF signal to be transmitted is then amplified by Power Amplifier 315 and sent through RF switch 360 to Antenna 310 for transmission.

The total component count in FIG. 3 is substantially less that the component count of a typical prior art wireless RF modem, as illustrated in FIG. 1. This represents a substantial savings in parts cost, assembly, device testing, and size.

Figure 4:
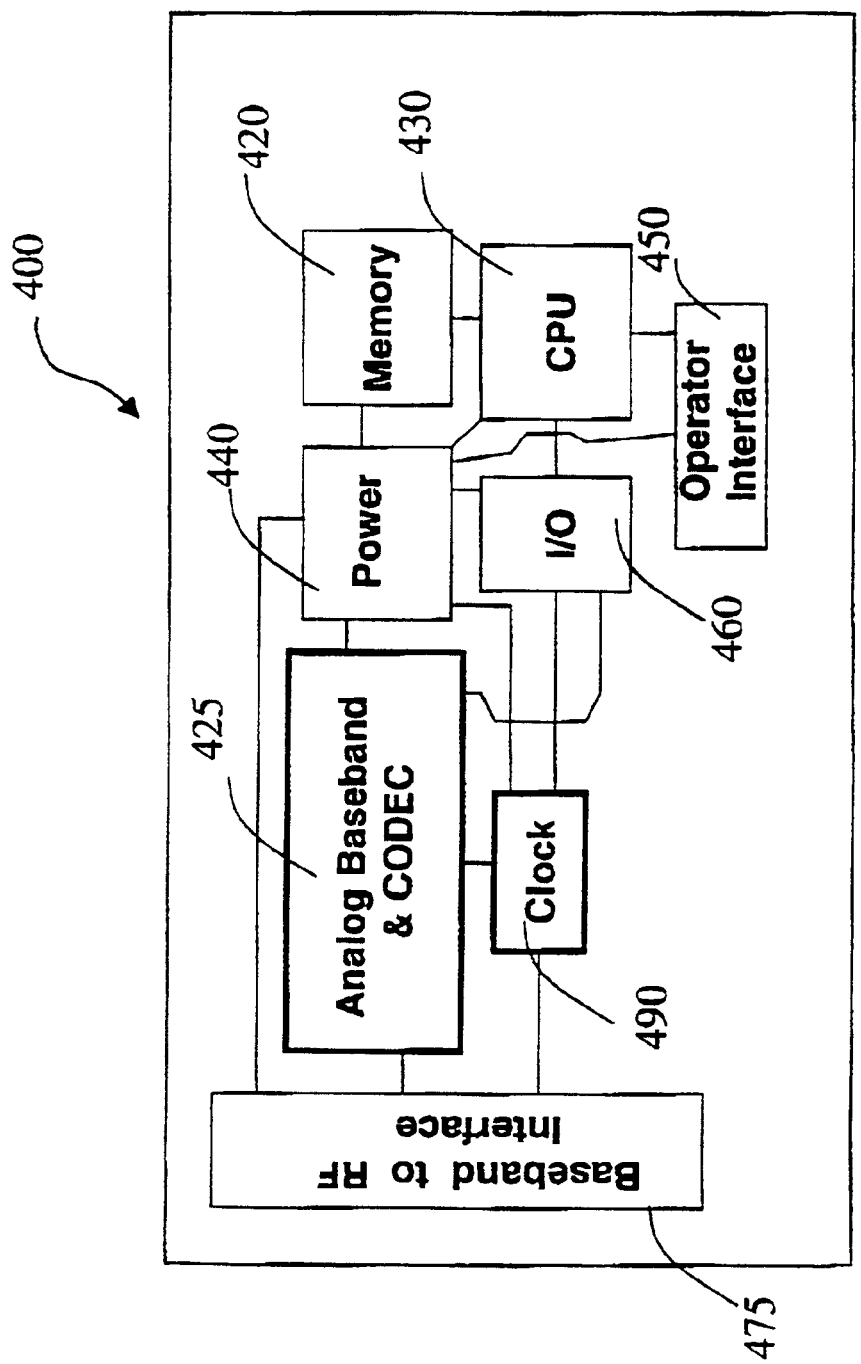
FIG. 4 is a schematic illustration of a host computer designed to work in conjunction with the wireless RF modem of FIG. 3.

FIG. 4 is a schematic illustration of a host computer 400 designed to work in conjunction with wireless RF modem 300 of FIG. 3. Host computer 400 contains a Power Source 440, a Memory 420, of type ROM, RAM, SRAM, Flash, or some combination of memory types, accessible to CPU 430. Computer system 110 circuitry 460 is shown connecting CPU 430 to a clock 490, to an Analog Baseband & Codec 425 and to the Power Source 440. Analog Baseband & Codec 425 performs baseband processing and protocol stack control and is available, for instance, from Analog Devices of Norwood, Mass. Data is sent or received through Baseband to RF interface 475 to the RF to Baseband connector 375 in RF modem 300. The above components of host computer 400 are electrically connected as illustrated by the solid lines in FIG. 4 between those components.

Host computer 400 operates as follows. In the receive mode, Analog Baseband and Codec 425 receives through Baseband to RF Interface 475 the modulated baseband analog signal generated by RF Modem 300 and processes it for proper demodulation, wherein the modulated signal is converted to a plurality of data bits including protocol data and any security coding. CPU 430 further processes the received signal by extracting the true data from the protocol data, removing any security coding, and sending the true data to a predetermined destination within host computer 400. Protocol stack control is performed by CPU 430 executing a protocol stack software program stored in Memory 420 and is thus performed entirely within host computer 400. Clock 490 provides a system clock to High Speed Synthesizer 380 of FIG. 3.

In the transmit mode, true data to be transmitted is operated upon by CPU 430, wherein the true data is wrapped with protocol data and any security data and sent to Analog Baseband & Codec 425. Analog Baseband & Codec 425 generates the modulated baseband analog signal and sends it to RF modem 300 through Baseband to RF Interface 475. Operator interface 450 is a standard host operator interface but can also display information concerning the operation of RF modem 300.

When wireless RF modem 300, shown in FIG. 3, is combined with host computer 400 of FIG. 4, the same functionality as the combination of FIG. 1 and FIG. 2 is achieved, but at a substantial reduction in parts, cost, and assembly time.

In another embodiment, the RF modem comprises an antenna and an RF head, similar to the embodiment illustrated in FIG. 3. However, in this embodiment the RF head is configured for performing analog to digital conversion during the receive mode and digital to analog conversion during the transmit mode. Accordingly, the interface is constructed to feed a digital signal into the host computing device during the receive mode and to receive a digital signal from the host computing device during the transmit mode.

Figure 5:
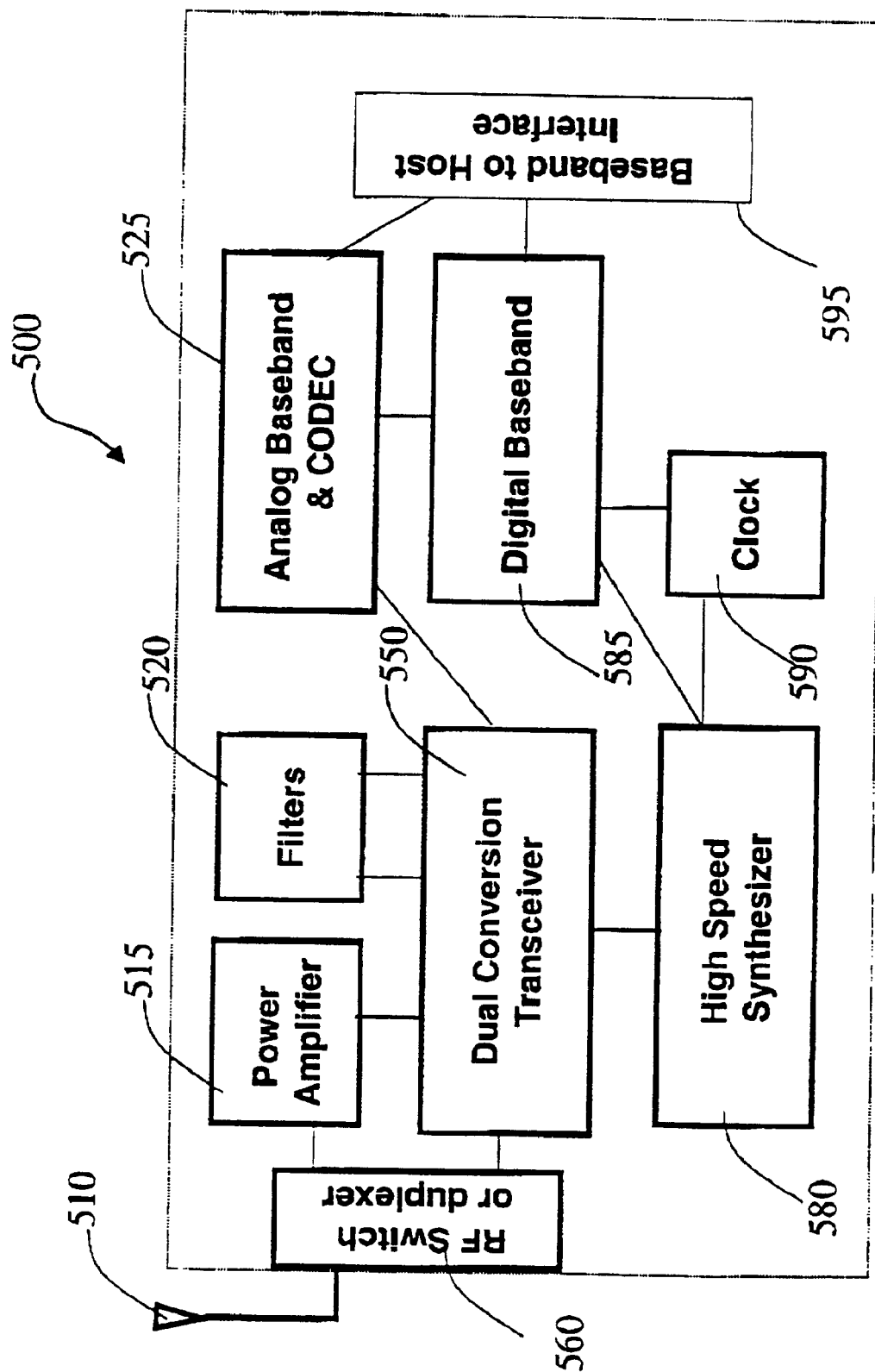
FIG. 5 is a schematic illustration of a detachable wireless RF modem in accordance with another embodiment of the present invention, wherein the modem has an antenna, an RF head, a baseband processing unit, and an interface and wherein the modem does not perform protocol stack control.

FIG. 5 is a schematic illustration of a detachable wireless RF modem 500 in accordance with another embodiment of the present invention, wherein the modem comprises Antenna 510, an RF head, a baseband processing unit, Clock 590 and Baseband to Host Interface 595. This embodiment is useful when it is not desirable to extensively modify the host computer hardware but where cost savings in the RF modem can still be realized. In this embodiment, the modem CPU function, the memory for data processing and storage, and the protocol stack control are in the external host computer.

RF modem 500 can be constructed using standard components. For instance: Dual Conversion Transceiver 350 and High Speed Synthesizer 580 are available from Texas Instruments of Dallas, Tex.; Analog Baseband and Codec 525 and Digital Baseband 585 are available from Analog Devices of Norwood, Mass; and RF to Baseband Interface 595 can be any standard interface that enables RF modem 500 to be inserted in a conventional way into an available slot in the host computer, i.e., Interface 595 enables RF modem 500 to be dimensioned to fit within a cradle for a PDA or enables RF modem 500 to be dimensioned to correspond to a PCMCIA personal computer card. Thus RF modem 500 can be designed to be housed inside the host computing device or it can be connected external to the host computing device. Moreover, the above components of RF modem 500 are electrically connected as illustrated by the solid lines in FIG. 5 between those components.

RF modem 500 operates as follows. In the receive mode, Antenna 510 receives an electromagnetic RF signal and forwards the RF signal to RF Switch 560. RF switch 560 may be a transmit/receive switch or a duplexer as required by the air standard. The received RF signal is then routed from RF switch 560 to Dual Conversion Transceiver 550 for conversion into a modulated baseband analog signal. Dual Conversion Transceiver 550 operates using various receive and transmit variable frequency oscillator signals that are provided by High Speed Synthesizer 580. Power amplifier 515 is fed the modulated RF signal from Dual Conversion Transceiver 550 and is fed a signal that controls power output so that Power Amplifier 515 can deliver requested power to RF Switch 560. The modulated baseband analog signal from Dual Conversion Transceiver 550 is fed into Analog Baseband and Codec 525 for proper demodulation to extract data bits having true data, which is representative of the information being received, protocol bits of data, and any security coding. Digital Baseband 585 works in conjunction with an external host computer CPU and an external protocol stack software program to further process the received signal to extract the true data from the protocol data, remove any security coding, and send the true data to an intended destination in the external host computer. Baseband to Host Interface 595 allows data to flow between the RF modem 500 and the external host computer. Clock 590 provides a system clock to Digital Baseband 585 and to High Speed Synthesizer 580.

In the transmit mode, true data to be transmitted is operated upon by the external host CPU in cooperation with Digital Baseband 585, wherein the true data is wrapped with protocol data and any security data and sent to Analog Baseband & Codec 525. Analog Baseband & Codec 525 generates the modulated baseband analog signal and sends it to Dual Conversion Transceiver 550 for conversion into an electromagnetic RF signal. The RF signal is then amplified by the Power Amplifier 515 and sent through RF Switch 560 to Antenna 510 for transmission.

The total component count of the modem shown in FIG. 5 is less than the component count of a typical prior art wireless RF modem, as illustrated in FIG. 1. This represents savings in parts cost, assembly, device testing, and size.

Figure 6:
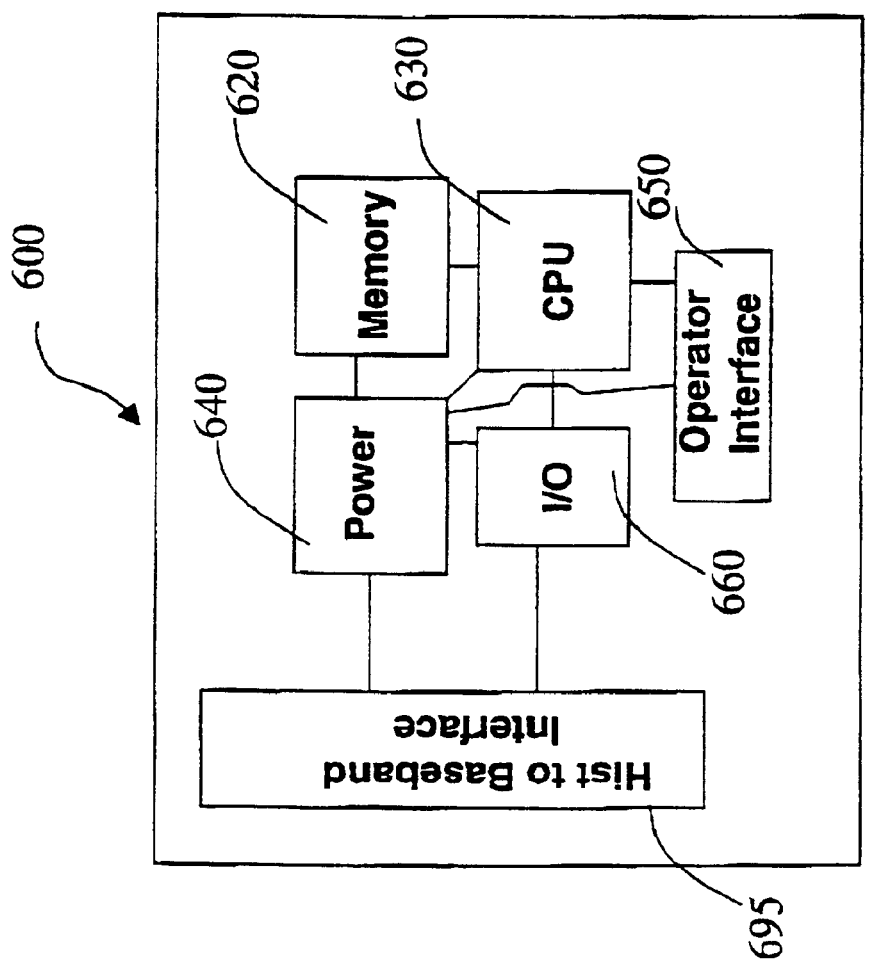
FIG. 6 is a schematic illustration of a host computer designed to work in conjunction with the wireless RF modem of FIG. 5.

FIG. 6 is a schematic illustration of a host computer 600 designed to work in conjunction with wireless RF modem 500 of FIG. 5. Host to Baseband Interface 695 connects with Baseband to Host Interface 595 shown in FIG. 5. Host computer 600 contains a Power Source 640, a Memory 620, of type ROM, RAM, SRAM, Flash, or some combination of memory types, accessible to CPU 630. Computer system I/O 660 circuitry is shown connecting CPU 630 to Host to Baseband interface 695. Data to be sent or received by CPU 630 is communicated to Interface 695. Protocol data and any security code or routing code are either added to true data during the transmit mode or stripped from the true data during the receive mode by special protocol stack software stored in Memory 620 and executed by the CPU 630. Standard software drivers are used for a connection using standard AT Modem commands. Operator interface 650 can be programmed to display information concerning the operation of RF modem 500. When wireless RF modem 500 is combined with host computer 600 and appropriate software, a reduction in cost over the prior art is realized because wireless communications are performed using only one CPU and one memory.

Figure 7:
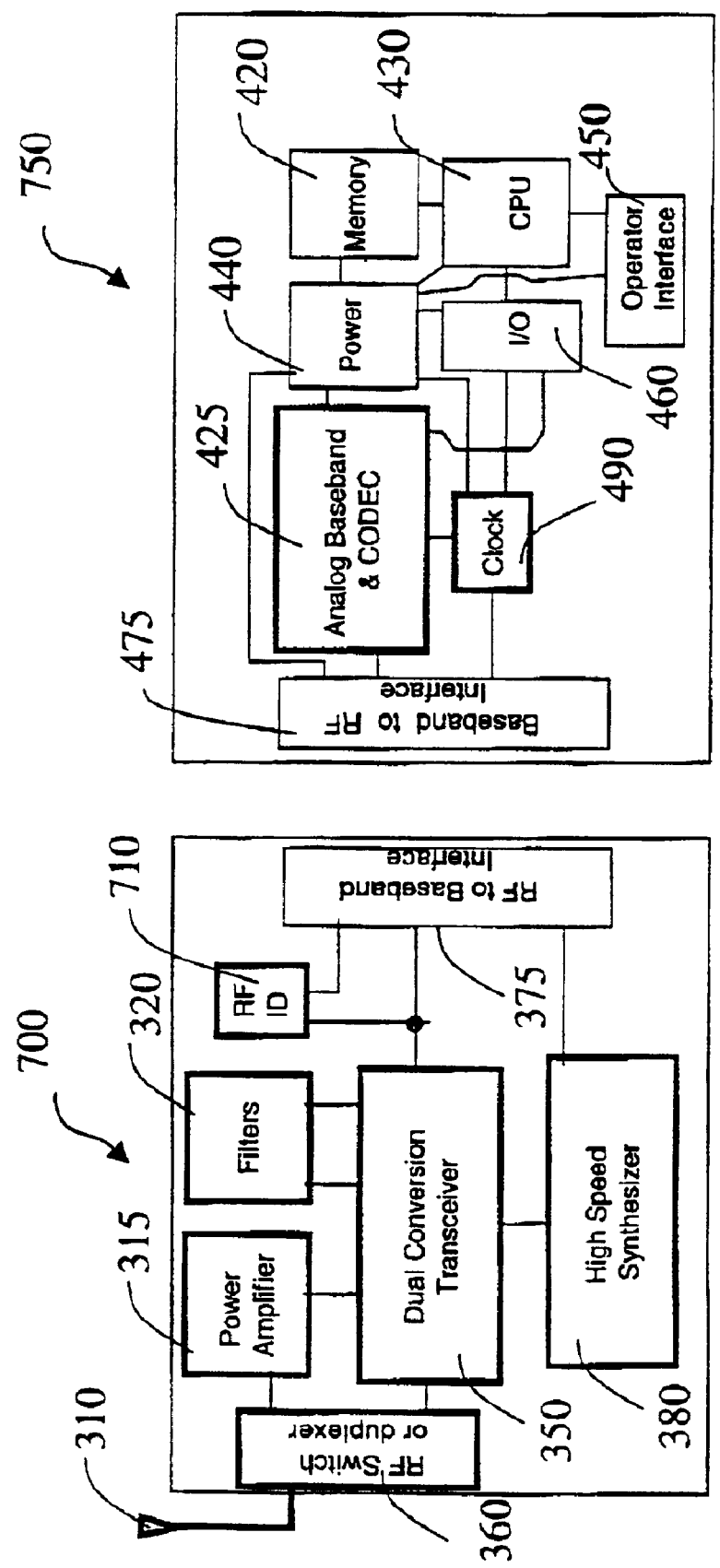
FIG. 7 is a schematic illustration of a system for wireless data communications in accordance with another embodiment of the present invention comprising the wireless RF modem of FIG. 3 equipped with an RFID unit and the host computer of FIG. 4 provided with RFID decoding software.

FIG. 7 is a schematic illustration of a system for wireless data communications in accordance with another embodiment of the present invention comprising the wireless RF modem of FIG. 3 equipped with an RF identification ("RFID") unit 710 and the host computer of FIG. 4 modified with RFID software that is added to Memory 420 and executed by CPU 430.

RFID 710 is powered by a Power Source 440. When power is first applied, RFID 710 preferably generates an analog tone identification signal to identify one or more predetermined characteristics of the RF head. The identification signal is coupled to the host computer 750 via RF to Baseband Interface 375. RFID software in host computer 750 programs Analog Baseband & Codec 425 to detect and decode the analog tone generated by RFID 710 during startup. Based upon the detected characteristics of the RF head contained in the signal from the RFID 710, CPU 430 configures Analog Baseband & Codec 425, Clock 490, High Speed Synthesizer 380, and Dual Conversion Transceiver 350 to transmit and receive at a desired standard and frequency under use, such as GSM at 1900 MHz, GSM at 1800 MHZ, CDMA at 1800 MHZ, etc. The identification signal from RFID unit 710 may also be a multi-tone or a signal tone at discrete frequencies, or the like. The identification signal may also be a digital signal generated by RFID unit 710. After CPU 430 configures RF modem 700, the RFID tones are disabled until the unit power is cycled on again.

In another embodiment of the present invention, the identical RFID 710 hardware and the accompanying software stored in the host computer memory and executed by the host CPU is be used with RF modem 500 shown in FIG. 5 in combination with host computer 600 shown in FIG. 6.

Figure 8:
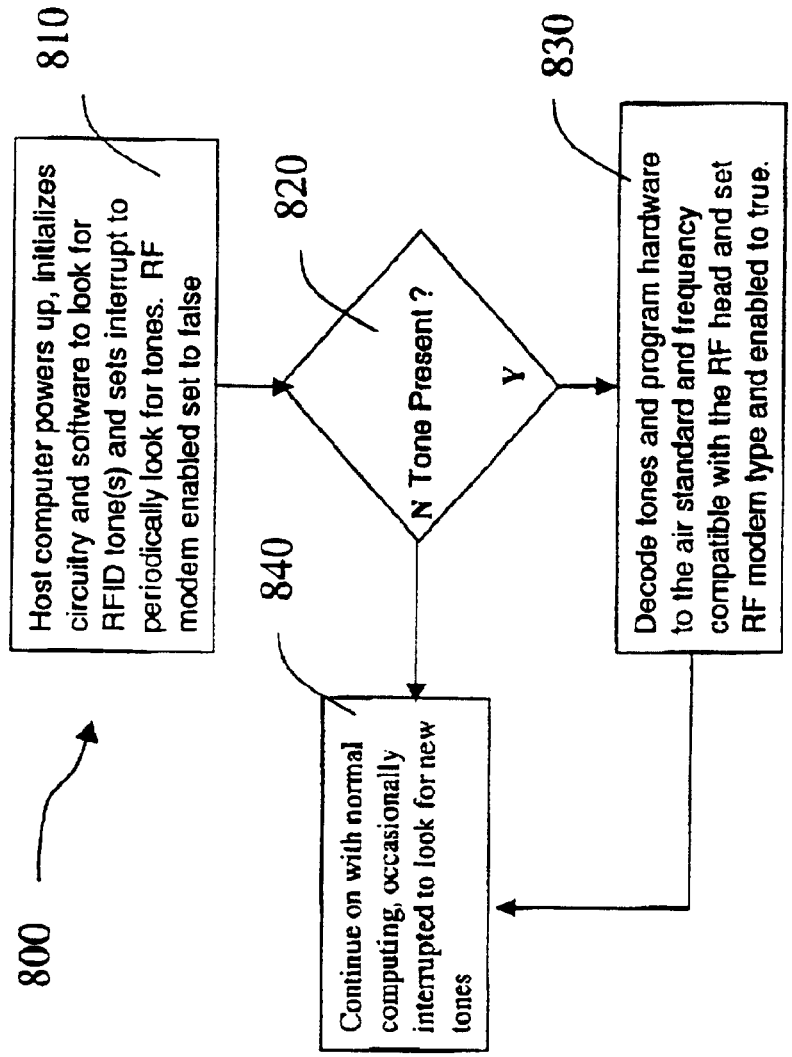
FIG. 8 is a flow chart illustrating steps taken by the system of FIG. 7, wherein the host computer identifies an identification signal emitted by the RFID unit.

FIG. 8 is a flow chart illustrating the steps taken by the system of FIG. 7, wherein a host computer identifies an RFID identification signal emitted by an RFID unit. In step 810, the host computer powers up, initializes host computer circuitry and software to look for at least one RFID tone and sets the host computer to periodically interrupt its operation to look for at least one different or new RFID tone. RF modem enabled is set to FALSE. In step 820, the presence of at least one RFID tone is tested for. If at least one RFID tone is found, the host computer CPU, at step 830, decodes the tone or tones and programs the hardware to an air standard and frequency compatible with the RF head and sets the RF modem to the detected air standard and sets RF modem enabled to TRUE. After these setup steps, the host computer CPU commences normal operation at step 840. The host computer's operation is occasionally interrupted to search for at least one different or new RFID tone indicating that a new or different RF head was in place. If an RFID tone is not detected in step 820, the host computer CPU continues on with normal operation in step 840.

In addition to the embodiments of the present invention illustrated above, the present invention may be practiced in many other ways, i.e., a direct conversion transceiver could be used in place of the dual conversion transceiver illustrated and Superhetrodyne or sub-sampling analog to baseband solutions may be used.

The embodiments of the distributed architecture wireless RF modem described above are illustrative of the principles of the present invention and are not intended to limit the invention to the particular embodiments described. Other embodiments of the present invention can be adapted for use in any RF wireless environment. Accordingly, while the preferred embodiment of the invention has been illustrated and described, it will be appreciated that various changes can be made therein without departing from the spirit and scope of the invention.

What is claimed is:

1. A wireless radio frequency (RF) modem constructed to cooperatively operate with a host computing device having a memory, a central processing unit ("CPU") for executing a protocol stack software program stored in said memory, and a baseband processing unit, said RF modem comprising:
    an antenna;
    an RF head coupled to said antenna and configured during a receive mode to receive an electromagnetic RF signal through said antenna and to convert said RF signal into a modulated baseband signal for baseband processing in said host computing device, said RF head further configured during a transmit mode to receive a modulated baseband signal generated by said host computing device and to convert said modulated baseband signal into an electromagnetic RF signal to feed to said antenna; and
    an interface coupled to said RF head and configured to physically couple said RF modem to said host computing device, said interface further configured during said receive mode to feed said modulated baseband signal generated by said RF head to said host computing device, such that said baseband processing unit in said host computing device is enabled to convert said modulated baseband signal into a plurality of bits of data including protocol data and true data, and said CPU in said host computing device operating under the control of said protocol stack software program is enabled to separate said protocol data from said true data, said interface further configured during said transmit mode to feed said modulated baseband signal generated by said host computing device to said RF head.

2. The RF modem of claim 1 wherein said RF head has at least one predetermined operating characteristic and wherein said RF modem further comprises an RF identification unit ("RFID") coupled between said RF head and said interface, said RFID operative to generate an identification signal that identifies said at least one operating characteristic of said RF head, said interface configured to feed said identification signal to said host computing device such that said host computing device is enabled to detect said identification signal and decode said at least one operating characteristic.

3. The RF modem of claim 2, wherein said identification signal is an analog tone.

4. The RF modem of claim 2, wherein said identification signal is a digital signal.

5. The RF modem of claim 2, wherein one said operating characteristic of said RF head is an air standard used by said RF head.

6. The RF modem of claim 2, wherein one said operating characteristic of said RF head is a frequency under which said RF head can operate.

7. The RF modem of claim 1, wherein said host computing device is a personal digital assistant.

8. The RF modem of claim 7, wherein said RF modem is dimensioned to fit within a cradle for said personal digital assistant.

9. The RF modem of claim 1, wherein said host computing device is a laptop computer.

10. The RF modem of claim 9, wherein said RF modem is dimensioned to correspond to a PCMCIA personal computer card.

11. The RF modem of claim 1, wherein said interface is located internal to said host computing device.

12. The RF modem of claim 1, wherein said interface is located external to said host computing device.

13. A system for providing wireless data communications comprising:
    (a) a detachable wireless radio frequency (RF) modem comprising:
        (1) an antenna;
        (2) an RF head coupled to said antenna, said RF head configured during a receive mode to receive an electromagnetic RF signal through said antenna and to convert said electromagnetic signal into a modulated baseband signal, said RF head further configured during a transmit mode to receive an externally generated modulated baseband signal and to convert said modulated baseband signal into an electromagnetic signal to feed to said antenna; and (3) an interface coupled to said RF head; and (b) a host computing device physically coupled to said RF modem via said interface, said host computing device configured during said receive mode to receive said modulated baseband generated by said RF head through said interface, to convert said modulated baseband signal into a plurality of bits of data including protocol data and true data, and to separate said protocol data from said true data, said host computing device further configured during said transmit mode to generate said modulated baseband signal for feeding to said RF head through said interface.

14. The system of claim 13, wherein said RF head has at least one predetermined operating characteristic and wherein said RF modem further comprises an RF identification unit ("RFID") coupled between said RF head and said interface, said RFID operative to generate an identification signal that identifies said at least one operating characteristic of said RF head, said interface configured to feed said identification signal to said host computing device such that said host computing device is enabled to detect said identification signal and decode said at least one operating characteristic.

15. A wireless radio frequency (RF) modem constructed to cooperatively operate with a host computing device having a memory and a central processing unit ("CPU") for executing a protocol stack software program stored in said memory, said RF modem comprising:

an antenna;

an RF head coupled to said antenna, said RF head configured during a receive mode to receive an electromagnetic RF signal through said antenna and to convert said electromagnetic signal into a modulated baseband signal, said RIP head further configured during a transmit mode to receive said modulated baseband signal and to convert said modulated baseband signal into said electromagnetic signal to feed to said antenna;

a baseband processing unit coupled to said RF head, said baseband processing unit configured during said receive mode to convert said modulated baseband signal into a plurality of bits of data, such that said host computing device's CPU operating under the control of said protocol stack software program is enabled to separate protocol data and true data from said bits of data said baseband processing unit further configured during said transmit mode to convert said plurality of bits of data including said protocol data and said true data into said modulated baseband signal; and an interface coupled to said baseband processing unit and configured to physically couple said RF modem to said host computing device said interface feeding said bits of data from said baseband processing unit to said host computing device during said receive mode and for feeding said bits of data from said host computing device to said baseband processing unit during said transmit mode.

16. The RF modem of claim 15 wherein said RF head has at least one predetermined operating characteristic and wherein said RF modem further comprises an RF identification unit ("RFID") coupled between said RF head and said interface, said RFID operative to generate an identification signal that identifies said at least one operating characteristic of said RF head, said interface configured to feed said identification signal to said host computing device such that said host computing device is enabled to detect said identification signal and decode said at least one operating characteristic.

17. A system for providing wireless data communications comprising:

(a) a detachable wireless radio frequency (RF) modem comprising:

(1) an antenna;

(2) an RF head coupled to said antenna, said RF head configured during a receive mode to receive an electromagnetic RF signal through said antenna and to convert said electromagnetic signal into a modulated baseband signal, said RF head further configured during a transmit mode to receive said modulated baseband signal and to convert said modulated baseband signal into said electromagnetic signal to feed to said antenna;

(3) a baseband processing unit coupled to said RF head, said baseband processing unit configured during said receive mode to convert said modulated baseband signal into a plurality of bits of data including protocol data and true data, said baseband processing unit further configured during said transmit mode to convert said plurality of bits of data including said protocol data and said true data into said modulated baseband signal; and (4) an interface coupled to said baseband processing unit; and (b) a host computing device physically coupled to said RF modem via said interface, said host computing device configured during said receive mode to separate said protocol data from said true data, said host computing device further configured during said transmit mode to combine said protocol data with said true data.

18. The system of claim 17, wherein said RF head has at least one predetermined operating characteristic and wherein said RF modem further comprises an RF identification unit ("RFID") coupled between said RF head and said interface, said RFID operative to generate an identification signal that identifies said at least one operating characteristic of said RF head, said interface configured to feed said identification signal to said host computing device such that said host computing device is enabled to detect said identification signal and decode said at least one operating characteristic.

19. A wireless radio frequency (RF) modem having at least one predetermined operating characteristic and constructed to cooperatively operate with a host computing device, said host computing device having a memory, a central processing unit ("CPU") for executing a protocol stack software program stored in said memory, and a baseband processing unit, said RF modem comprising:

an antenna;

an RF head configured during a receive mode to receive an electromagnetic RF signal through said antenna coupled to said RF head and to convert said electromagnetic signal into a modulated baseband signal for baseband processing in said host computing device, said RF head further configured during a transmit mode to receive a modulated baseband signal generated by said host computing device and to convert said modulated baseband signal into an electromagnetic signal to feed to said antenna;

an interface coupled to said RF head and configured to physically couple said RF modem to said host computing device, said interface further configured during said receive mode to feed said modulated baseband signal generated by said RF head to said host computing device, such that said baseband processing unit is enabled to convert said modulated baseband signal into a plurality of bits of data including protocol data and true data, and said CPU operating under the control of said protocol stack software program is enabled to separate said protocol data from said true data, said interface further configured during said transmit mode to feed said modulated baseband signal generated by said host computing device to said RF head; and an RF identification unit ("RFID") coupled between said RF head and said interface, said RFID operative to generate an identification signal that identifies said at least one operating characteristic of said RF head, said interface configured to feed said identification signal to said host computing device such that said host computing device is enabled to detect said identification signal and decode said at least one operating characteristic.

20. A wireless radio frequency (RF) modem having at least one predetermined operating characteristic and constructed to cooperatively operate with a host computing device having a memory and a central processing unit ("CPU") for executing a protocol stack software program stored in said memory, said RF modem comprising:

an antenna;

an RF head coupled to said antenna, said RF head configured during a receive mode to receive an electromagnetic RF signal through said antenna and to convert said electromagnetic signal into a modulated baseband signal, said RF head further configured during a transmit mode to receive said modulated baseband signal and to convert said modulated baseband signal into said electromagnetic signal to feed to said antenna;

a baseband processing unit coupled to said RF head, said baseband processing unit configured during said receive mode to convert said modulated baseband signal into a plurality of bits of data including protocol data and true data, such that said CPU operating under the control of said protocol stack software program is enabled to separate said protocol data from said true data, said baseband processing unit further configured during said transmit mode to convert said plurality of bits of data including said protocol data and said true data into said modulated baseband signal;

an interface coupled to said baseband processing unit and configured to physically couple said RF modem to said host computing device; and an RF identification unit ("RFID") coupled between said RF head and said interface, said RFID operative to generate an identification signal that identifies said at least one characteristic of said RF head, said interface configured to feed said identification signal to said host computing device such that said host computing device is enabled to detect said identification signal and decode said at least one operating characteristic.

21. A method for wireless data communications in a system comprising a wireless radio frequency ("RF") modem having an RF head and an interface, said RF modem constructed to cooperatively work with and be physically coupled at said interface to a host computing device, said host computing device having a memory, a central processing unit ("CPU") for executing a protocol stack software program stored in said memory and a baseband processing unit, said method comprising:

(a) receiving by said system an RF electromagnetic signal having information to be received, said receiving comprising:
(1) receiving in said RF head said electromagnetic signal;
(2) converting by said RF head said electromagnetic signal into a modulated baseband signal;
(3) feeding by said RF modem through said interface said modulated baseband signal into said host computing device;
(4) converting by said baseband processing unit said modulated baseband signal into a plurality of bits of data including protocol data and true data;
(5) separating said protocol data from said true data by said CPU in said host computing device operating under the control of said protocol stack software program; and (b) transmitting by said system an electromagnetic RF signal having information to be sent, said transmitting comprising:
(1) generating by said baseband processing unit in said host computing device a modulated baseband signal from said plurality of bits of data including said protocol data and said true data, said plurality of data bits representing said information to be sent;
(2) feeding by said host computer through said interface said modulated baseband signal into said RF modem;
(3) converting by said RF head said modulated baseband signal into said electromagnetic signal having information being sent.

22. A method for wireless data communications in a system comprising a wireless radio frequency ("RF") modem having an RF head, a baseband processing unit and an interface, said RF modem constructed to cooperatively work with and be physically coupled at said interface to a host computing device, said host computing device having a memory and a central processing unit ("CPU") for executing a protocol stack software program stored in said memory, said method comprising:

(a) receiving by said system an electromagnetic RF signal having information to be received, said receiving comprising:
(1) receiving in said RF head said electromagnetic signal;
(2) converting by said RF head said electromagnetic signal into a modulated baseband signal;
(3) converting by said baseband processing unit said modulated baseband signal into a plurality of bits of data including protocol data and true data;
(4) feeding by said RF modem through said interface said plurality of bits of data into said host computing device;
(5) separating said protocol data from said true data by said CPU operating under the control of said protocol stack software program; and (b) transmitting by said system an electromagnetic RF signal having information to be sent, said transmitting comprising:
(1) generating by said CPU in said host computing device said plurality of data bits including said protocol data and said true data, said plurality of data bits representing said information to be sent;

(2) feeding by said host computing device through said interface said plurality of data bits into said RF modem;

(3) generating by said baseband processing unit a modulated baseband signal from said plurality of bits of data bits including said protocol data and said true data;

(4) converting by said RF head said modulated baseband signal into said electromagnetic signal having information being sent.

23. A method for detecting an identification signal in a system comprising a wireless radio frequency ("RF") modem having an RF head with at least one predetermined operating characteristic and a radio frequency identification ("RFID") unit for generating an identification signal that identifies said at least one operating characteristic of said RF head, said system further comprising a host computing device physically connected to said modem and having, a power supply, memory and a central processing unit ("CPU") for executing RFID software stored in said memory, said method comprising:

(a) powering up said host computing device and initializing said host computing device to detect said identification signal;

(b) setting said host computing device to periodically interrupt its operation to detect for a different identification signal;

(c) setting said modem enabled to FALSE;

(d) detecting for the presence of said identification signal, and if said identification signal is detected:
 (1) decoding said identification signal to determine said at least one characteristic of said RF head;
 (2) programming said modem and said host computing device according to said characteristics of said RF head; and
 (3) setting said modem enabled to TRUE; and (e) performing normal operations by said CPU and setting said host computing device to periodically interrupt its operation to detect for a different identification signal.

24. A detachable wireless radio frequency (RF) modem constructed to cooperatively operate with a host computing device having a memory, a central processing unit ("CPU") for executing a protocol stack software program stored in said memory, and a baseband processing unit, said RF modem comprising:

an antenna;

an RF head coupled to said antenna and configured during a receive mode to receive an electromagnetic RF signal through said antenna, to convert said RF signal into a modulated baseband analog signal and to perform digital to analog conversion of said RF signal to enable said host computing device to perform a baseband processing function, said RF head further configured during a transmit mode to receive a digital signal generated by said host computing device and to convert said digital signal into an electromagnetic RF signal to feed to said antenna; and an interface coupled to said RF head and configured to physically couple said RF modem to said host computing device, said interface further configured during said receive mode to feed said digital signal generated by said RF head to said host computing device, to enable said baseband processing unit to perform said baseband processing function and to enable said CPU operating under the control of said protocol stack software program to separate protocol data from true data, said interface further configured during said transmit mode to feed said digital signal generated by said host computing device to said RF head.

25. The RF modem of claim 1, wherein said modulated baseband signal is an analog signal.

26. The RF modem of claim 1, wherein said modulated baseband signal is a digital signal.

27. The RF modem of claim 1, wherein the RF modem is detachable.

28. The system of claim 13, wherein said modulated baseband signal is an analog signal.

29. The system of claim 13, wherein said modulated baseband signal is a digital signal.

30. The RF modem of claim 15, wherein said modulated baseband signal is an analog signal.

31. The RF modem of claim 15, wherein said modulated baseband signal is a digital signal.

32. The system of claim 17, wherein said modulated baseband signal is an analog signal.

33. The system of claim 17, wherein said modulated baseband signal is a digital signal.

34. The RF modem of claim 19, wherein said modulated baseband signal is an analog signal.

35. The RF modem of claim 19, wherein said modulated baseband signal is a digital signal.

36. The RF modem of claim 20, wherein said modulated baseband signal is an analog signal.

37. The RF modem of claim 20, wherein said modulated baseband signal is a digital signal.

38. The RF modem of claim 21, wherein said modulated baseband signal is an analog signal.

39. The RF modem of claim 21, wherein said modulated baseband signal is a digital signal.

40. The method of claim 22, wherein said modulated baseband signal is an analog signal.

41. The method of claim 22, wherein said modulated baseband signal is a digital signal.

* * * * *